United States Patent [19]

Blake

[11] Patent Number: 4,766,794
[45] Date of Patent: Aug. 30, 1988

[54] ROTARY SAW BLADE

[76] Inventor: Robert A. Blake, 16766 Lincoln, East Detroit, Mich. 48021

[21] Appl. No.: 899,677

[22] Filed: Aug. 25, 1986

[51] Int. Cl.$^4$ ............................................. B27B 33/08
[52] U.S. Cl. ........................................ 83/847; 83/848; 83/851
[58] Field of Search ................. 83/839, 840, 846, 848, 83/851, 847; 144/218, 238, 239

[56] References Cited

U.S. PATENT DOCUMENTS

| | | | |
|---|---|---|---|
| 1,711,102 | 4/1929 | Sierra, Jr. | 83/848 |
| 2,756,787 | 7/1956 | Siese | 83/848 |
| 3,347,289 | 10/1967 | Kotesovec et al. | 83/848 |
| 3,576,200 | 4/1971 | Elmes | 83/848 |
| 3,831,484 | 8/1974 | Gibb | 83/847 |
| 4,011,783 | 3/1977 | Mobley | 83/846 |
| 4,024,785 | 5/1977 | Jansen-Herfeld | 83/848 |

Primary Examiner—E. R. Kazenske
Assistant Examiner—Hien H. Phan
Attorney, Agent, or Firm—Cullen, Sloman, Cantor, Grauer, Scott and Rutherford

[57] ABSTRACT

A radial saw blade is formed of a flat disc having peripheral edge including circular peripheral portions and recessed stepped peripheral portions. The peripheral edge includes spaced apart, radially inwardly extending notches. Each notch has a flat, plate-like insert brazed to an L-shaped seat in the notch facing the direction of rotation. Each insert has cutting edges formed on side edges of the inserts which extend axially from both sides of the disc and on a crown edge extending radially from the peripheral edge of the disc. The side and crown edges each have beveled surfaces extending away from the direction of rotation to define a relief angle. A first set of the notches are positioned about the circular peripheral portion of the peripheral edge. The inserts in the first set of notches make the primary cut in both linear and non-linear passes. A second set of notches are circumferentially spaced along the recessed peripheral portions, or stepped portions, of the blade and are located at different radial distances from the center of the disc. The side cutting edges of the inserts in the second set of notches radially overlap the side cutting edges of radially adjacent cutting inserts in the second set of notches. The inserts in the second set of notches plane the raw cut edges cut by the first set of inserts on straight cuts. The inserts in the second set of notches also cut in the axial direction relative to the disc for curved and diagonal cutting to prevent the blade from binding in the kerf by providing axial relief.

7 Claims, 1 Drawing Sheet

ROTARY SAW BLADE

BACKGROUND OF THE INVENTION

This invention relates to a rotary saw blade which planes as it saws, cuts curves and dadoes. This blade is an improvement over circular saw blades which utilize hard metal inserts as cutting teeth.

Circular saw blades used in portable and table radial saws are formed of flat, circular discs made of steel. The peripheral edge of circular saw blades are notched at regular intervals. Inserts formed of tungsten carbide may be brazed to the edge of each notch facing in the direction of rotation. The outer radial edge of each insert establishes the depth of cut, while the axial edges form the width of the cut, or kerf, cut by the saw. The kerf limits the cutting movement of the saw blade to straight line cuts.

In the use of a circular saw blade, any significant deviation from a straight cut results in the kerf walls binding upon the radially inward portion of the saw blade. Less efficient saws such as a coping saw or band saw, are used to cut curves in work pieces.

Edges produced by a circular saw when cutting through a wood workpiece are normally relatively rough. The rough edges formed in a wooden workpiece are subsequently smoothed with a hand or power planer if the rough edge produced by the saw is unacceptable for the intended use.

Consequently, there is a need for a rotary saw blade which both cuts and smooths the raw edges of a kerf and permits cutting curves and dadoes by permitting movement of the saw blade axially when making a cut in addition to the normal radial movement of the blade.

SUMMARY OF THE INVENTION

The invention relates to a rotary saw blade having hard metal inserts secured within notches formed in the peripheral edge of a disc. The peripheral edge has circular peripheral portions and recessed stepped peripheral portions. The inserts are brazed in seats formed in the notches which face in the direction of rotation of the disc. The inserts have cutting edges formed on side edges which extend axially from both sides of the disc and on a crown edge extending radially from the peripheral edge. The side edges and crown edge each have a beveled surface extending away from the direction of rotation and toward the disc. A first set of inserts is equally spaced circumferentially about the circular peripheral portion. A second set of the inserts is spaced circumferentially about the stepped peripheral portion. The second set of inserts is arranged at sequentially increasing distances from the center of the disc. The side edges of each of the second set of inserts radially overlaps the side edges of radially adjacent inserts. The second set of inserts compliment the cutting action of the first set of inserts on straight cuts by planing the rough edges cut by the first set of inserts. The second set of inserts also permits curved cutting and diagonal cutting because the side edges of the inserts cut in the axial direction relative to the disc. Two stepped peripheral portions are provided at diametrically opposed locations on the blade.

The seats in which the inserts are brazed are preferably substantially L-shaped recesses. The short leg of each L-shaped recess extends circumferentially from a radiused gullet. The long leg of each L-shaped recess extends substantially radially. The non-intersecting ends of the long and short legs are aligned radially relative to the center of the disc. The face of an insert brazed to the seat is inclined to define a positive rake angle. The beveled surfaces of the inserts extending away from the side edges and crown edges define a negative rake angle.

The overlapping side edges of the inserts in the stepped portion of the saw blade enable the blade to cut with the side of the blade into the kerf or to simultaneously plane the kerf. Side cutting is achieved by moving blade in a curved path or diagonally. Sideways movement of the blade is facilitated by the stepped portion wherein the first step cuts an arcuate path of a limited depth in the wooden work piece. The next sequential insert cuts a slightly larger overlapping or contiguous arcuate path just below and slightly deeper into the sidewall than the first arcuate path in the same side with subsequent steps being successively deeper and further into the sidewall until the sidways movement of the blade is completed. The ability to cut sideways enables the blade to cut curves and dadoes while remaining engaged in the work.

An object of this invention is to provide a blade means for a rotary saw for cutting curves and diagonally without the saw binding against the work to be cut.

A further object of this invention is to provide a means for simultaneously smooth planing the raw cut edges of the kerf cut by the first set of cutter inserts.

These and other objects and advantages of this invention will become apparent upon reading the following description and studying the attached drawings.

DETAILED DESCRIPTION OF INVENTION

The rotary saw blade 10 is formed of a disc 11 made of a flat, relatively rigid steel plate. The disc is provided with a central hole 12 through which it is mounted on a conventional arbor or other mounting device of a table or radial arm saw.

Figure 1:
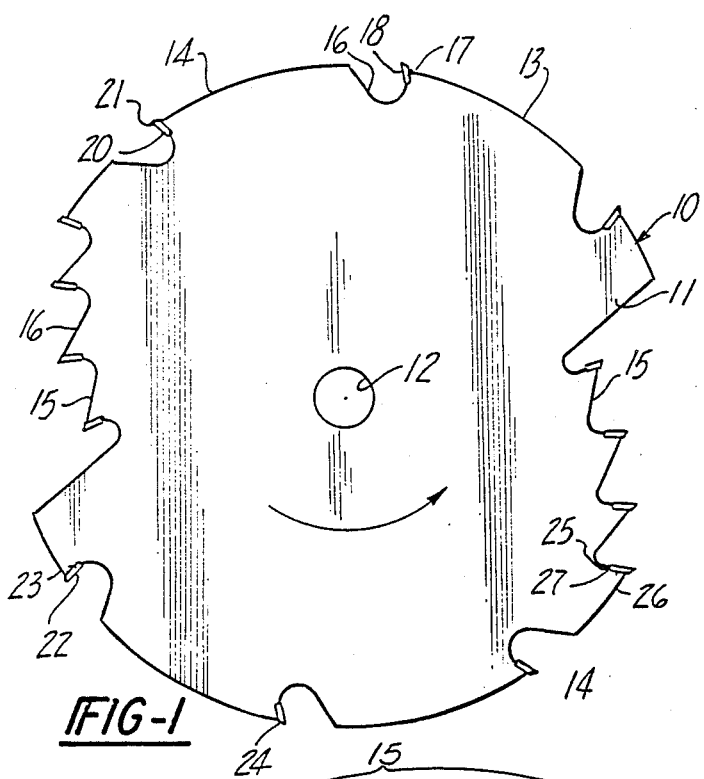
FIG. 1 is a plan view of a saw blade made in accordance with this invention.

Referring to FIG. 1, a peripheral edge 13 of the disc 11 includes two circular portions 14 and two stepped portions 15 comprising a series of radially recessed steps. The circular portions 14 and stepped portions 15 are alternately provided on the peripheral edge 13 with the circular portions 14 and the stepped portions 15 being diametrically oppositely located to provide a balanced blade. Two sets of spaced apart notches 16 are formed in the peripheral edge 13 of the disc 11. A first set of notches is formed in the circular portion 14 and a second set of notches is formed in the stepped portion 15. L-shaped seats 17 are formed in each of the notches in the edge of each notch facing the direction of rotation. Carbide inserts 18 are secured by a brazing layer 19 within the seats 17. The carbide inserts 18 are preferably formed of tungsten carbide to provide a durable and effective cutting element.

Figure 2:
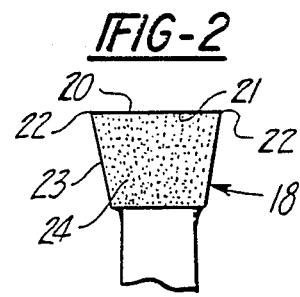
FIG. 2 is an enlarged, fragmentary side view of an insert.
Figure 3:
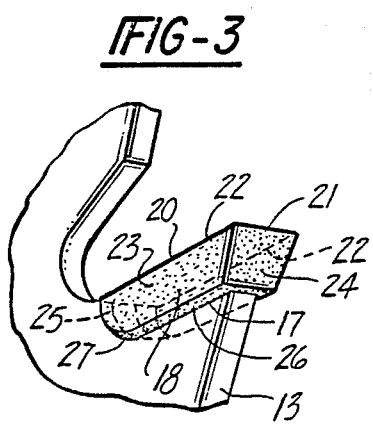
FIG. 3 is a fragmentary perspective view of an insert disposed in a notch.

Referring to FIGS. 1, 2, and 3, the inserts 18 have a flat, rectangular face 20 which is elongated in the radial direction relative to the saw blade. A crown edge 21 is defined at the radially outermost edge of the face 20 and parallel side edges 22 are defined at the edges of the inserts 18 extending outwardly from the opposite axial sides of the saw blade. A beveled surface 23 defining a relief angle extends from a side edges 22 away from the direction of rotation toward the sides of the disc. Another beveled surface 24 defining a relief angle extends from the crown edge 21 away from the direction of rotation toward the peripheral edge 13.

The side edges 22 of each insert 18 in the stepped portion 15 are located at different radial distances from the center of the disc. The side edges 22 of each insert 18 in the stepped portion radially overlap or match the side edges of radially adjacent inserts in the stepped portion.

As shown in FIGS. 1 and 3, the seats 17 are generally L-shaped having a short leg 25 which intersects a long leg 26 at a radiused intersection 27. The short leg 25 extends substantially circumferentially and the long leg 26 extends substantially radially.

Figure 4:
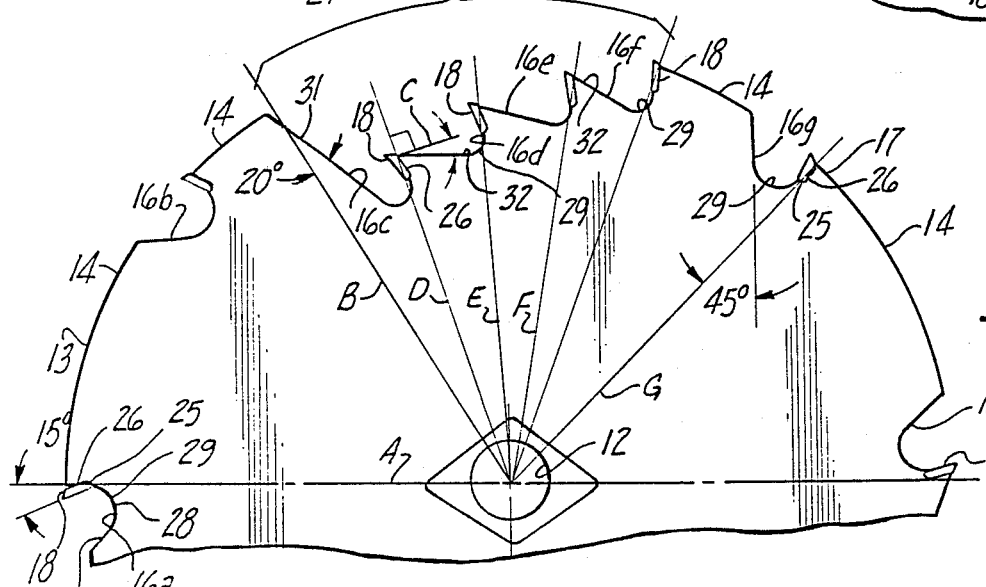
FIG. 4 is a fragmentary, plan view of a portion of the rotary saw blade.

As shown in FIG. 4, the inserts 18 are retained in the seats 17 at approximately a +15 degree rake angle relative to a line A which extends from the center hole 12 through the non-intersecting ends of the short leg 25 and the long leg 26. The non-intersecting end of the long leg extends to the peripheral edge 13 of the disc and the non-intersecting end of the short leg extends to the gullet 28 of the notch 16 through which shavings and saw dust are directed as they are removed by the cutting edges of the inserts 18. More particularly, the short leg is contiguous with a radiused shoulder 29 which forms part of the gullet 28 at the radially innermost portion of the notch 16. The gullet 28 of the notches in the circular portion 14 also includes a back surface 30 extending between the shoulder 29 and the peripheral edge 13 on the opposite side of the notch from the insert.

The fragment of the saw blade shown in FIG. 4 consists of slightly more than half of the saw blade with the stepped portion 15 centered between two circular portions 14. In the bottom portion of FIG. 4, two inserts 18 are located at diametrically opposite sides of the central hole 12 in notches 16a and 16h. The direction of rotation of the blade as shown in FIG. 4 is counterclockwise.

Proceeding clockwise from the notch 16a on the left side of FIG. 4, a circular perimeter portion 14 extends to the next notch 16b. Following notch 16b the peripheral edge 13 forms part of the circular portion 14.

The circular portion 14 terminates at an extended back surface 31 of the next sequential notch 16c which forms a transition to the stepped portion 15 of the blade. The extended back surface 31 of the notch 16c extends radially inwardly to a greater extent than the preceding notch 16b. The extended back surface 31 is preferably disposed at an inclination of +20 degrees from the radially extending line B passing through the center hole 12 and the intersection of the peripheral edge 13 and extended back surface 31. A top surface 32 following the insert 18 in notch 16c is disposed at a −20 degree angle relative to a line C which is perpendicular to the radial line D extending from the center hole 12 to the intersection of the long leg 26 of notch 16C and the top surface 32. Top surface 32 leads into the shoulder 29 preceding the next insert 18 in notch 16d. The stepped portion 15 comprises repetitions of the shoulder 29, insert 18 and top surface 32 in sequence forming notches 16d and 16e. The fourth insert 18 in the stepped portion 15 is located in notch 16f at the transition point between the circular portion 14 and the stepped portion 15. Notch 16f is preceded by a top surface 32 and shoulder 29 but is followed by the circular portion 14 of the peripheral edge 13. The fourth insert has the same orientation as the inserts in the first set of notches.

The non-intersecting ends of the short leg 25 and long leg 26 of the seat 17 are aligned along a radial line E approximately −2 degrees from the radial line F extending from the center hole 12 through the intersecting ends of the legs of the L-shaped seat. The face 20 of the insert 18 and the long leg 26 of the L-shaped seat 17 are generally parallel and are aligned at approximately a +15 degree rake angle in both the stepped portions 15 and the circular portions 14.

The inserts 18 and the notches 16c-f are circumferentially spaced about the stepped portion 15 and are located at different radial distances from the center of the disc.

The back surface 30 of the next notch 16g extends to the radiused shoulder 29. The back surface 30 is disposed at an angular orientation of about 45 degrees relative to a radial line G extending from a center hole through the non-intersecting ends of the short leg 25 and the long leg 26 of the L-shaped seat 17 formed in notch 16g. The circular portion 14 continues to notch 16h which is identical to notch 16g.

Figure 5A:
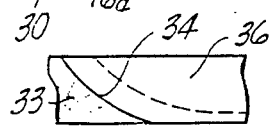
FIGS. 5a-5c is a series of schematic side elevation cross-sectional views showing a progression of insert cutting paths as the blade is moved sideways during a cutting operation.
Figure 5B:
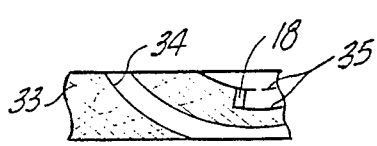
Figure 5C:
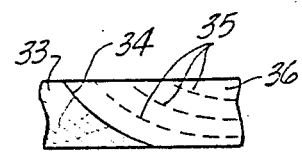
Figure 6A:
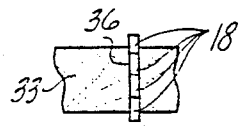
FIGS. 6a-6c is a series of schematic front elevation cross-sectional views similar to FIGS. 5a-5c showing the progession of insert cutting paths as the blade is moved sideways during a cutting operation.
Figure 6B:
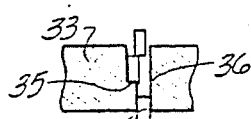
Figure 6C:
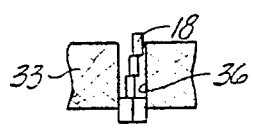

Referring not to FIGS. 5 and 6, the cutting sequence of the rotaray saw blade 10 is described. The sequence of views shown in FIGS. 5 and 6 correspond to each other and are a progressive sequence from left to right. In the left view of FIGS. 5 and 6 the saw is shown in a conventional linear cutting mode wherein the teeth in the circular peripheral portions 14 are in radial alignment with the inserts 18 in the stepped portion 15. The primary cutting action in this configuration is performed by the set of inserts 18 in the circular portion with the set of inserts in the stepped portion 15 primarily being effective to plane the kerf cut in the workpiece 33. The cutting arc 34 is the arc defined by the rotation of the inserts in the circular peripheral portion 14.

The center view in FIGS. 5 and 6 schematically shows the side cutting arcs defined as the blade is rotated while the blade is moved axially, or sideways, such as when the blade is moved in a curved path or diagonally. The side cutting arcs 35 are laterally offset from the kerf formed by the preceding insert in the circular portion. An insert 18 is shown in the center view of FIG. 5 partially through its cutting arc where it is removing a portion of a side wall 36 of the kerf formed by the inserts in the circular portion 14.

Referring to the right view in FIGS. 5 and 6 the cutting arcs of the stepped portion have been completed and the kerf has been widened, thereby permitting the blade to be realigned as required for curving or cutting diagonal cuts in the workpiece 33 in a single pass.

The radially outermost insert 18 of the stepped portion 15 moves through an arc equivalent in radial extent to the inserts in the circular portion 14, but is axially offset from the kerf formed by the preceding insert in the circular portion 14. The degree of offset is progressively increased by each successive insert 18 in the stepped portion 15. The inserts in the stepped portion 15 widen the kerf incrementally when the blade is moved sideways.

The present invention achieves the surprising result of enabling a rotary saw blade to cut circles and curves in wooden workpieces with a rotary saw. The unique stepped portion of the saw blade permits axial movement of the saw blade in addition to the radial movement which greatly increases the versatility and usefulness of the radial saw.

The saw blade of the present invention can also be used to plane the material to a limited exterrd with satisfactory smoothness. To achieve the best surface smoothness, the depth of cut when planing with the saw blade should be less than the radial extent of the inserts in the circular portion.

Dado cuts aer performed simply and easily with the blade of the present invention by making parallel border cuts on opposite sides of the dado. The portion of the workpiece located between the border cuts is then removed by moving the blade forward and towards the opposite side of the dado both right and left to clear material between the two border cuts.

The blade of the present invention leaves a smooth kerf on straight cuts because the inserts on the stepped portion plane as a rip or cross cut is made.

Having fully described an operative embodiment of this invention, I now claim:

1. A rotary saw blade for cutting wood comprising:
a substantially flat disc having an outer peripheral edge formed with opposed sets of stepped teeth positioned between and directly adjacent opposed sets of teeth, each of said sets including a peripheral section, said peripheral edge having radial inwardly extending notches;
said peripheral sections of said opposed sets of stepped teeth each having a plurality of said notches radially stepped about said periphery, said stepped notches being arranged at sequentially decreasing radial distances from the center of said flat disc in the direction of rotation of said rotary saw blade and being arranged at circumferentially spaced distances about the periphery of each peripheral section of said opposed sets of stepped teeth;
said peripheral sections of said opposed sets of teeth each having a plurality of said notches arranged at substantially equal radial distances from said center of said flat disc and circumferentially spaced about the periphery of each peripheral section of said opposed sets of teeth;
said notches of said opposed sets of stepped teeth increasing radially to a distance from said center equal to the radial distance from said center of the notches of said opposed sets of teeth;
a cutting insert arranged within each of said notches and affixed in a seat facing in the direction of rotation of said disc, said inserts having cutting edges formed on side edges of said inserts extending radially from both sides of said disc and a crowned edge extending axially from said peripheral edge, said side edges and said crown edge each having a beveled surface extending from the direction of rotation of said disc and toward said disc to define a relief angle;
wherein said inserts are affixed within said notches of said opposed sets of stepped teeth to cut in an axial direction relative to said disc for curved cutting and for diagonal cutting and wherein said inserts within said opposed sets of stepped-teeth raw cut edges cut by said opposed sets of teeth of inserts on straight cuts.

2. A rotary saw blade as defined in claim 1, and the seats each being an L-shaped recess wherein the short leg of the L extends circumferentially from a radially inset portion of the notch and the long leg of the L extends substantially radially, the short leg and long leg intersecting each other at one end of each, wherein the non-intersecting ends of the long and short legs are aligned radially relative to the center of the disc and the insert is inclined to define a positive rake angle.

3. A rotary saw blade as defined in claim 2, and each notch having a gullet for removing chips cut from the wood, the gullet extending from the non-intersecting end of the short leg to a further radially recessed point and to the peripheral edge following the next circumferentially adjacent insert in the direction of rotation.

4. A rotary saw blade for cutting wood comprising:
a substantially flat disc having an outer peripheral edge and having opposed sets of teeth with the teeth at equal radial distance, specifically a first set and a third set, positioned between opposed sets of stepped teeth, specifically a second set and a fourth set;
said first set including a plurality of cutting edges spaced circumferentially about a first peripheral section of said disc between and directly adjacent said fourth set and said second set, said cutting edges of said first set being positioned at equal radial distances from the center of said disc;
said second set including a plurality of cutting edges positioned circumferentially and directly adjacent said first set between said first set and said third set and spaced circumferentially about a second peripheral section of said disc, said cutting edges of said second set being radially stepped with respect to said center and radially decreasing with respect to said center in the direction of rotation of said disc;
said third set including a plurality of cutting edges spaced circumferentially about a third peripheral section of said disc and positioned circumferentially and directly adjacent said second set between said second set and said fourth set, said cutting edges of said third set being positioned at equal radial distances from the center of said disc;
said fourth set including a plurality of cutting edges positioned circumferentially and directly adjacent said first set between said first set and said third set and spaced circumferentially about a fourth peripheral section of said disc, said cutting edges of said fourth set being radially stepped with respect to said center and radially decreasing in the direction of rotation of said disc.

5. The rotary saw of claim 4, wherein each of said cutting edges includes a radial inwardly extending notch and a cutting insert arranged within each of the notches and affixed in a seat facing in the direction of rotation of the disc, the inserts having cutting edges formed on side edges of the inserts extending radially from both sides of the disc and a crown edge extending axially from the peripheral edge, the side edges and crown edge each having a beveled surface extending away from the direction of rotation and toward the disc to define a relief angle.

6. A rotary saw blade as defined in claim 5, and the seats each being an L-shaped recess wherein the short leg of the L extends circumferentially from a radially inset portion of the notch and the long leg of the L extends substantially radially, the short leg and long leg intersecting each other at one end of each, wherein the non-intersecting ends of the long and short legs are aligned radially relative to the center of the disc and the insert is inclined to define a positive rake angle.

7. A rotary saw blade as defined in claim 6, and each notch having a gullet for removing chips cut from the wood, the gullet extending from the non-intersecting end of the short leg to a further radially recessed point and to the peripheral edge following the next circumferentially adjacent insert in the direction of rotation.

* * * * *